United States Patent
Kitayama et al.

(10) Patent No.: US 10,184,019 B2
(45) Date of Patent: Jan. 22, 2019

(54) OPTICAL THERMOPLASTIC RESIN AND FORMED BODY

(71) Applicant: Kaneka Corporation, Osaka (JP)

(72) Inventors: Fuminobu Kitayama, Hyogo (JP); Nobuyoshi Maizuru, Hyogo (JP); Keisuke Hatano, Osaka (JP)

(73) Assignee: KANEKA CORPORATION, Osaka (JP)

( * ) Notice: Subject to any disclaimer, the term of this patent is extended or adjusted under 35 U.S.C. 154(b) by 108 days.

(21) Appl. No.: 15/107,958

(22) PCT Filed: Dec. 24, 2014

(86) PCT No.: PCT/JP2014/084180
§ 371 (c)(1),
(2) Date: Jun. 24, 2016

(87) PCT Pub. No.: WO2015/098980
PCT Pub. Date: Jul. 2, 2015

(65) Prior Publication Data
US 2016/0326289 A1 Nov. 10, 2016

(30) Foreign Application Priority Data
Dec. 27, 2013 (JP) ................. 2013-271181

(51) Int. Cl.
*C08F 220/18* (2006.01)
*C08F 220/14* (2006.01)
*C08J 5/18* (2006.01)
*G02B 1/04* (2006.01)
*C08K 3/013* (2018.01)

(52) U.S. Cl.
CPC .......... *C08F 220/18* (2013.01); *C08F 220/14* (2013.01); *C08J 5/18* (2013.01); *C08K 3/013* (2018.01); *G02B 1/04* (2013.01); *C08F 2220/185* (2013.01); *C08J 2333/10* (2013.01); *C08J 2333/12* (2013.01)

(58) Field of Classification Search
CPC ............................ C08F 220/18; C08F 220/14; C08F 2220/185; C08J 5/18; G02B 1/04; G02B 233/10; G02B 233/12; C08K 3/0033

USPC .......................................................... 524/544
See application file for complete search history.

(56) References Cited

U.S. PATENT DOCUMENTS

| 4,373,065 A | 2/1983 | Prest, Jr. | |
| 6,201,045 B1 * | 3/2001 | Koike | C08K 5/00 428/913 |
| 6,586,515 B1 * | 7/2003 | Koike | G02B 5/3083 524/425 |
| 9,273,208 B2 * | 3/2016 | Shimamoto | C08F 8/32 |
| 2014/0045995 A1 * | 2/2014 | Shimamoto | C08F 8/32 525/78 |

FOREIGN PATENT DOCUMENTS

| JP | 3648201 B2 | 5/2005 |
| JP | 3696649 B2 | 9/2005 |
| JP | 2007009191 A * | 1/2007 |
| JP | 2009282482 A | 12/2009 |
| JP | 2010095567 A * | 4/2010 |
| JP | 4624845 B2 | 2/2011 |
| JP | 2011168681 A * | 9/2011 |
| WO | 1996/006370 A1 | 2/1996 |
| WO | WO 2001025364 A1 * | 4/2001 |
| WO | 2005108438 A1 | 11/2005 |
| WO | WO 2012114718 A1 * | 8/2012 |

OTHER PUBLICATIONS

International Search Report issued in International Application No. PCT/JP2014/084180, dated Mar. 3, 2015 (2 pages).
International Preliminary Report on Patentability issued in International Application No. PCT/JP2014/084180, dated Jul. 7, 2016 (9 pages).
Office Action issued in counterpart Japanese Application No. 2015-554966; dated Dec. 4, 2018 (7 pages).

* cited by examiner

*Primary Examiner* — Michael M Bernshteyn
(74) *Attorney, Agent, or Firm* — Osha Liang LLP (57) ABSTRACT

An object of the present invention is to provide an optical thermoplastic resin having excellent transparency and color tone, and also excellent heat stability, as well as being extremely low in both orientation birefringence and photoelastic birefringence; and a formed body made of said resin. This optical thermoplastic resin has a rate of reduction in melt viscosity of less than 20%, an orientation birefringence of $-1.7 \times 10^{-4}$ to $1.7 \times 10^{-4}$, a photoelastic constant of $-2 \times 10^{-12}$ to $2 \times 10^{-12}$ $Pa^{-1}$, and, when formed into a 2 mm-thick formed body, has a haze of 1% or less.

17 Claims, 2 Drawing Sheets

OPTICAL THERMOPLASTIC RESIN AND FORMED BODY

TECHNICAL FIELD

One or more embodiments of the present invention relates to an optical thermoplastic resin and a formed body.

BACKGROUND

Light-permeable resins are widely used as materials for forming film-, plate-, and lens-like optical members for use in various optical devices (e.g., films, substrates, prism sheets, and diffusers for use in liquid crystal display devices; lenses in lens systems for signal reading of optical disk devices; Fresnel lenses and lenticular lenses for projection screens). Such resins are generally called "optical resins" or "optical polymers".

Birefringence is one of important optical characteristics that should be taken into consideration when optical resins are used to form optical members. That is, in most cases, it is undesirable that optical resins have high birefringence. Particularly, in the above-mentioned applications (liquid crystal display devices, optical disk devices, projection screens, etc.), the presence of a birefringent film, sheet or lens in an optical path adversely affects image quality or signal reading performance, and therefore the use of an optical member made of an optical resin whose birefringence is as low as possible is desired. Needless to say, camera lenses, eyeglass lenses, and the like also preferably have low birefringence.

Meanwhile, as is well known in the art, birefringence of an optical polymer includes "orientation birefringence" mainly caused by the orientation of main chains of the polymer and "photoelastic birefringence" caused by stress. Orientation birefringence and photoelastic birefringence have their respective signs that depend on the chemical structure of a polymer, and are properties intrinsic to individual polymers.

That is, orientation birefringence generally develops when main chains of a chain-like polymer (polymer chains) are oriented, and this orientation of main chains occurs in a process involving the flowing of a material, such as an extrusion-forming or stretching process during production of a polymer film or an injection forming process frequently used for production of optical members with various shapes, and is fixed and remains in an optical member. Hereinafter, the phrase "orientation birefringence is positive" means that a refractive index is large in a direction parallel to the orientation direction of polymer chains, and the phrase "orientation birefringence is negative" means that a refractive index is large in a direction orthogonal to the orientation direction of polymer chains.

On the other hand, photoelastic birefringence is caused by elastic deformation (distortion) of a polymer. In the case of an optical member using a polymer, elastic deformation (distortion) occurs and remains in its material due to, for example, volume contraction caused by cooling to a temperature around the glass transition temperature of the polymer or lower, which becomes the cause of photoelastic birefringence. Further, the material is elastically deformed also by, for example, external force exerted on the optical member fixed to a device used at ordinary temperature (glass transition temperature or lower), which causes photoelastic birefringence. As shown by the following formula, a photoelastic constant is defined as a coefficient $\gamma$ of $\Delta\sigma$ when a birefringence difference $\Delta n$ is caused by a stress difference $\Delta\sigma$.

$$\Delta n = \gamma \Delta \sigma$$

Hereinafter, the phrase "photoelastic birefringence is positive" means that a refractive index is large in a direction parallel to a direction in which tensile stress is applied (orientation direction of polymer chain), and the phrase "photoelastic birefringence is negative" means that a refractive index is large in a direction orthogonal to a direction in which tensile stress is applied.

Various methods for suppressing such birefringence have been studied.

For example, Patent Literature 1 discloses a non-birefringent optical resin material obtained by blending two polymer resins that are opposite in the sign of orientation birefringence to each other and are completely miscible. However, it is difficult to uniformly mix the two polymer resins described in Patent Literature 1 to obtain a practical polymer resin that uniformly exhibits low orientation birefringence as a whole, and aggregates of the polymer resins may cause defects caused by foreign matter. Further, the polymer resins blended are different in their intrinsic refractive index, and therefore light scattering occurs due to non-uniformity of refractive index, which makes it impossible to obtain an optical material excellent in transparency. Although there is no description about photoelastic birefringence, it is conceivable that a polymer composition of Example will have significantly high photoelastic birefringence. Further, there is also no description about transparency and color tone of the optical resin material when applied to a thick formed body such as an injection-formed body, and poor transparency and poor color tone are assumed.

Patent Literature 2 discloses a method for obtaining a non-birefringent optical resin material by adding, to a matrix composed of a transparent polymer resin, a low-molecular material whose orientation birefringence tends to cancel out the orientation birefringence of the polymer resin material. The low-molecular material has a molecular weight of 5000 or less, and a resulting formed body has excellent transparency. However, there is no description about improvement in photoelastic birefringence. Further, there is a case where heat resistance is reduced. Further, there is also no description about transparency and color tone of the optical resin material when applied to a thick formed body such as an injection-formed body, and poor transparency and poor color tone are assumed.

Patent literature 3 discloses a method for obtaining an optical resin material having low orientation birefringence by adding, to a transparent polymer resin, a birefringent fine inorganic substance that is oriented in the same direction as the linked chains of the polymer resin as the polymer resin is oriented by the application of external force. Orientation birefringence can be suppressed also by this method, but there is no description about improvement in photoelastic birefringence. Further, there is also no description about transparency and color tone of the optical resin material when applied to a thick formed body such as an injection-formed body, etc. and poor transparency and poor color tone are assumed.

Patent literature 4 discloses a method for obtaining a non-birefringent optical resin material having low orientation birefringence and low photoelastic birefringence, in which an optical material having a multicomponent system of three or more components including a binary or higher
} copolymerization system is obtained by selecting the combination and constituent ratio (compositional ratio) of components of the multicomponent system so that both the orientation birefringence and photoelastic birefringence of the optical material are cancelled out at the same time. This method makes it possible to extremely reduce both orientation birefringence and photoelastic birefringence at the same time, which could not heretofore be achieved. However, in the case of assuming extrusion film forming as well as precision injection forming such as thin forming or complex shape forming, it is also assumed that polymer decomposition may occur under severe forming conditions such as high temperature and high shear. In particular, since the thermal stability of the polymer is low, occurrence of appearance defects such as foaming due to the polymer decomposition even during injection forming, as well as reduction in transparency and color tone are assumed.

CITATION LIST

Patent Literatures

PTL 1: U.S. Pat. No. 4,373,065
PTL 2: Japanese Patent No. 3696649
PTL 3: Japanese Patent NO. 3648201
PTL 4: Japanese Patent No. 4624845

SUMMARY OF INVENTION

One or more embodiments of the present invention provide an optical thermoplastic resin having excellent transparency and color tone, and also excellent heat stability, as well as being extremely low in both orientation birefringence and photoelastic birefringence; and a formed body made of said resin. Particularly, one or more embodiments of the present invention provide an injection-formed body excellent in optical isotropy, transparency, and color tone even in a thick formed body.

In view of the above, the present inventors have conducted intensive studies, succeeded in producing a novel thermoplastic resin which not only is low in both orientation birefringence and photoelastic birefringence but also has heat stability by using an acrylic monomer.

That is, one or more embodiments of the present invention relates to:

[1] an optical thermoplastic resin having a rate of reduction in melt viscosity of less than 20%, an orientation birefringence of $-1.7 \times 10^{-4}$ to $1.7 \times 10^{-4}$, a photoelastic constant of $-3.7 \times 10^{-12}$ to $3.7 \times 10^{-12}$ $Pa^{-1}$, and, when formed into a 2 mm-thick formed body, having a haze of 1% or less;

[2] The optical thermoplastic resin according to [1], which is an acrylic resin;

[3] The optical thermoplastic resin according to [2], wherein the acrylic resin has as a structural unit a methacrylic ester and an acrylic ester;

[4] An optical thermoplastic resin having as a structural unit a methacrylic ester and an acrylic ester, and having an orientation birefringence of $-1.7 \times 10^{-4}$ to $1.7 \times 10^{-4}$ and a photoelastic constant of $-3.7 \times 10^{-12}$ to $3.7 \times 10^{-12}$ $Pa^{-1}$:

[5] The optical thermoplastic resin according to any one of [1] to [4], which is obtained by polymerizing a monomer mixture containing 99.9 to 50 wt % of a methacrylic ester, 0.1 to 50 wt % of an acrylic ester, and 0 to 40 wt % of another monofunctional monomer copolymerizable therewith;

[6] The optical thermoplastic resin according to any one of [3] to [5], wherein the methacrylic ester includes methyl methacrylate and at least one selected from the group consisting of benzyl methacrylate, dicyclopentanyl methacrylate, 2,2,2-trifluoroethyl methacrylate, and phenoxyethyl methacrylate;

[7] The optical thermoplastic resin according to any one of [1] to [6], which has a transmitted YI of 5 or less when formed into a 2 mm-thick formed body;

[8] An optical resin composition comprising the optical thermoplastic resin according to any one of [1] to [7];

[9] The optical resin composition according to [8], further comprising birefringent inorganic microparticles;

[10] The optical resin composition according to any one of [8] and [9], further comprising a birefringent low-molecular compound;

[11] The optical thermoplastic resin according to any one of [8] to [10], which has a transmitted YI of 5 or less when formed into a 2 mm-thick formed body;

[12] A film made of the optical thermoplastic resin according to any one of [1] to [7] or the optical resin composition according to any one of [8] to [11];

[13] The film according to [12], which is obtained by melt extrusion; and

[14] An injection-formed body made of the optical thermoplastic resin according to any one of [1] to [7] or the optical resin composition according to any one of [8] to [11].

The optical thermoplastic resin according to one or more embodiments of the present invention is extremely low in both orientation birefringence and photoelastic birefringence, and has excellent transparency and color tone, and high heat stability, so that it is possible to provide a formed body such as an optical film with a few defects of poor appearance derived from thermal decomposition, as well as an injection-formed body with excellent optical isotropy, transparency, and color tone for optical applications.

DESCRIPTION OF EMBODIMENTS

Hereinafter, embodiments of the present invention will be explained in detail, but the present invention is not limited to these embodiments.

An optical thermoplastic resin according to one or more embodiments of the present invention has optical characteristics of an orientation birefringence of $-1.7 \times 10^{-4}$ to $1.7 \times 10^{-4}$ and a photoelastic constant of $-3.7 \times 10^{-12}$ to $3.7 \times 10^{-12}$ Pa-1. A concept to meet the above-mentioned advantageous effect of one or more embodiments of the invention by the optical thermoplastic resin according to the present disclosure will be described.

In the extrusion film forming or injection forming under high discharge conditions, film drawing conditions, or low temperature forming conditions, there is a birefringence caused by orientation of polymer chains. In particular, the injection forming is an excellent forming method in mass production of a member of a complex three-dimensional shape such as a lens. Injection molding allows a molten resin to flow into a mold at a high speed for shaping and quenching. However, both the residual orientation and the residual stress of the formed body are very large as compared to, for example, cast forming, compression forming, melt extrusion forming, or the like. Thus, it is difficult to completely remove the birefringence resulting from the residual migration or residual stress in conventional transparent resin materials.

Birefringence generated by polymer orientation is generally called orientation birefringence. Further, birefringence caused in association with elastic deformation (distortion) of the polymer in a formed body when stress is applied to the formed body is called photoelastic birefringence. From the above, it is important to design the optical thermoplastic resin according to one or more embodiments of the present invention such that orientation birefringence and photoelastic birefringence are not generated even by any forming method.

(Orientation Birefringence)

First, the measuring conditions of "orientation birefringence" in the present disclosure will be defined as follows. As described above, orientation birefringence develops due to orientation of polymer chains, but birefringence (orientation birefringence) in a polymer film varies depending on the degree of orientation of polymer chains. Therefore, in the present disclosure, "orientation birefringence" is measured under conditions defined as follows.

The optical thermoplastic resin needs to be formed into a some form of formed body to measure its orientation birefringence. In the present disclosure, the formed body is defined as a film. Hereinbelow, measurement of "orientation birefringence" will be described with reference to a case where the formed body is a melt-extrusion formed film.

Measurement of "Orientation Birefringence" of Film

First, a test specimen of 25 mm×90 mm is cut out from a film (original film) having a film thickness of 125 μm (so that its longitudinal direction is parallel to MD), both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C., and a sample is taken from the central portion of the film to measure birefringence.

The above-described "orientation birefringence" depends on the degree of polymer orientation, and is therefore influenced by various sample preparation conditions including stretching conditions. For this reason, evaluation conditions have been specified above. For example, the stretching temperature is preferably in the range of −30° C. to +30° C. of the glass transition temperature, more preferably in the range of +0° C. to +30° C. of the glass transition temperature, and may be appropriately set to a temperature in the range of, for example, +5° C. to +30° C. of the glass transition temperature. However, in order to determine the sign of birefringence of each sample and to quantitatively determine the relative magnitude relationship between samples, it is important to use measurement values obtained under the almost same measuring conditions such as stretching conditions.

(Photoelastic Birefringence (Photoelastic Constant))

As has been described above, photoelastic birefringence is birefringence caused by elastic deformation (distortion) of a polymer in a formed body when stress is applied to the formed body. In fact, the intrinsic "photoelastic constant" of the polymer is determined, which makes it possible to evaluate the degree of photoelastic birefringence of the material. First, stress is applied to the polymer material and birefringence is measured when the polymer material is elastically distorted. A proportional constant between the obtained birefringence and the stress is defined as a photoelastic constant. The birefringences of polymers at the time when stress is applied to the polymers can be evaluated by comparing the photoelastic constants of the polymers.

As in the case of the above-described "orientation birefringence", the optical thermoplastic resin needs to be formed into a some form of formed body to measure its photoelastic birefringence. In the present disclosure, the formed body is defined as a film or injection-formed body. Hereinbelow, the measurement of "photoelastic constant" will be described with reference to a case where the formed body is a melt-extrusion formed film and an injection-formed body.

Measurement of "Photoelastic Constant" in Film

As in the case of the above-described "orientation birefringence", a strip-shaped test specimen of 15 mm×90 mm is cut out from a film (original film) having a thickness of 125 μm (so that its longitudinal direction is parallel to TD). Then, one of the long sides of the test specimen is fixed, and in this state, birefringence is measured at 23° C. while a load applied to the other long side is increased from 0 kgf to 4 kgf by 0.5-kgf increments. The magnitude of a change in birefringence per unit stress is calculated from the obtained result to determine a photoelastic constant.

Measurement of "Photoelastic Constant" in Injection-Formed Body

An optical thermoplastic resin is injection-formed to obtain a flat plate (thickness: 2 mm, size: 15 cm×10 cm). A test specimen having a size of 15 mm×90 mm is cut out from the central portion of the obtained plate (so that the long side 90 mm is in the longitudinal direction). The measurement conditions and the calculation method are the same as in the case of the melt extrusion film described above.

When there is a large difference in thickness between samples to be compared in the measurement of photoelastic birefringences of films or injection-formed bodies, there is a possibility that the samples are different from each other in how stress is applied, and therefore there is a case where it is difficult to strictly compare photoelastic constants between the samples. However, there is not a large difference in how stress is applied between the sample of the film having a thickness of 125 μm and the injection-formed body having a thickness of 2 mm described in the present disclosure, and therefore it is possible to compare photoelastic constants between samples when a difference in thickness between the samples is at such a level as described above. Therefore, both the above-described film and the injection-formed body can be appropriately used to measure a photoelastic constant (birefringence). The same applies to orientation birefringence.

As described in Patent Literature 4, it is known that additivity is established between the orientation birefringence (intrinsic birefringence) and the photoelastic constant of a resulting polymer and the orientation birefringence (intrinsic birefringence) and the photoelastic constant of homopolymers corresponding to monomer species used for copolymerization. It is to be noted that the term "intrinsic birefringence" refers to birefringence when polymer chains are completely oriented in one direction.

Specific examples of a monomer are given below as a reference for setting the orientation birefringence and photoelastic constant of a polymer, but the monomer species is not limited thereto (a value within [ ] represents the photoelastic constant of a corresponding homopolymer).

Monomers showing positive photoelastic birefringence:

| Benzyl methacrylate | [48.4 × $10^{-12}$ $Pa^{-1}$] |
|---|---|
| Dicyclopentanyl methacrylate | [6.7 × $10^{-12}$ $Pa^{-1}$] |
| Styrene | [10.1 × $10^{-12}$ $Pa^{-1}$] |
| Parachlorostyrene | [29.0 × $10^{-12}$ $Pa^{-1}$] |

Monomers showing negative photoelastic birefringence:

| Methyl methacrylate | [−4.3 × $10^{-12}$ $Pa^{-1}$] |
|---|---|
| 2,2,2-trifluoroethyl methacrylate | [−1.7 × $10^{-12}$ $Pa^{-1}$] |
| 2,2,2-trichloroethyl methacrylate | [−10.2 × $10^{-12}$ $Pa^{-1}$] |
| Isobornyl methacrylate | [−5.8 × $10^{-12}$ $Pa^{-1}$] |

Polymers showing positive intrinsic birefringence:

| Polybenzyl methacrylate | [+0.002] |
|---|---|
| Polyphenylene oxide | [+0.210] |
| Bisphenol A polycarbonate | [+0.106] |
| Polyvinyl chloride | [+0.027] |
| Polyethylene terephthalate | [+0.105] |
| Polyethylene | [+0.044] |

Polymers showing negative intrinsic birefringence:

| Polymethyl methacrylate | [−0.0043] |
|---|---|
| Polystyrene | [−0.100] |

Although the data of photoelastic constants and orientation birefringences of some polymers is shown above, both the birefringences are not always the same in sign depending on the type of polymer. For example, some polymers have a "positive" orientation birefringence and a "negative" photoelastic constant. The signs of the orientation birefringence and photoelastic birefringence (constant) of some homopolymers are shown in the following Table 1 as examples.

TABLE 1

| Homopolymer | Sign of orientation birefringence | Sign of photoelastic constant |
|---|---|---|
| Poly(methyl methacrylate) (MMA) | Negative | Negative |
| Poly(2,2,2-trifluoroethyl methacrylate) (3FMA) | Positive | Negative |
| Poly(benzyl methacrylate) (BzMA) | Positive | Positive |

For example, it is known that the orientation birefringence of a poly(MMA/BzMA) copolymer having a composition of around 82/18 (wt %) is substantially zero and that the photoelastic birefringence (constant) of a poly(MMA/BzMA) copolymer having a composition of around 92/8 (wt %) is substantially zero. As shown above, it is understood that it is difficult for a binary system copolymer to be zero in both orientation birefringence and photoelastic constant. Therefore, Patent Literature 4 has revealed that a terpolymer of MMA/3FMA/BzMA can be zero in both orientation birefringence and photoelastic constant.

However, since the thermoplastic resins obtained from the invention of Patent Literature 4 are all composed of a methacrylic ester, zipping depolymerization occurs during their precision forming such as extrusion film forming and injection forming where exposure to high temperatures due to a long residence time in a forming machine or shear heat generation are envisioned, so that forming defects and poor appearances such as foaming and yellowing are likely to occur. In particular, in the case of extrusion film formation in combination with a polymer filter having a fine pore size for removing foreign substances, or in the case of injection forming of thin and complex shapes such as lenses, forming defects such as foaming and yellowing frequently occur to also reduce transparency, because of which, in some cases, such formed bodies may be difficult to be practically used.

Then, as a result of extensive studies this time, it has been found that heat stability of the copolymer can be significantly improved while maintaining optical isotropy by designing copolymerization composition to be low in both orientation birefringence and photoelastic constant and copolymerizing the composition together with at least a small amount of acrylic esters. Copolymerization of the acrylic ester makes it possible to suppress the zipping depolymerization of the polymethacrylic ester while maintaining the optically isotropy.

Hereinafter the monofunctional monomer used in one or more embodiments of the present invention will be shown as examples, but is not limited to the followings.

(Methacrylic Ester)

Methacrylic esters are not particularly limited and are preferably those whose alkyl group has 1 to 12 carbon atoms from the viewpoint of polymerizability and cost, and the alkyl group may be linear or branched. Examples of the methacrylic ester include methyl methacrylate, ethyl methacrylate, propyl methacrylate, n-butyl methacrylate, t-butyl methacrylate, 2-ethylhexyl methacrylate, benzyl methacrylate, dicyclopentanyl methacrylate, dicyclopentenyl methacrylate, 2,2,2-trifluoroethyl methacrylate, 2,2,2-trichloroethyl methacrylate, isobornyl methacrylate, phenoxyethyl methacrylate, pentamethylpiperidinyl methacrylate, tetramethylpiperidinyl methacrylate, tetrahydrofurfuryl methacrylate, and tert-butylcyclohexyl methacrylate. These monomers may be used alone or in combination of two or more thereof. Among them, in particular, methyl methacrylate and at least one selected from the group consisting of benzyl methacrylate, dicyclopentanyl methacrylate, 2,2,2-trifluoroethyl methacrylate, and phenoxyethyl methacrylate are preferably included from the viewpoint of easily achieving a balance between heat resistance and optical isotropy. It is more preferable to include at least one selected from the group consisting of benzyl methacrylate, dicyclopentanyl methacrylate, and phenoxyethyl methacrylate; 2,2,2-trifluoroethyl methacrylate; and methyl methacrylate. Among them, it is more preferable to include benzyl methacrylate, 2,2,2-trifluoroethyl methacrylate, and methyl methacrylate. As a methacrylic ester component, methacrylic esters other than these preferred methacrylic esters mentioned above may be further contained.

Methyl methacrylate is preferably contained in an amount of preferably 20 to 80 wt %, more preferably 30 to 70 wt %, even more preferably 40 to 60 wt %, per 100 wt % of the total amount of the monomers used in the optical thermoplastic resin according to one or more embodiments of the present invention.

At least one selected from the group consisting of benzyl methacrylate, dicyclopentanyl methacrylate, and phenoxyethyl methacrylate is contained in an amount of preferably 0.1 to 30 wt %, more preferably 0.1 to 20 wt %, even more preferably 0.1 to 10 wt %, per 100 wt % of the total amount of the monomers used in the optical thermoplastic resin according to one or more embodiments of the present invention. Among them, benzyl methacrylate is contained in an amount of preferably 0.1 to 30 wt %, more preferably 0.1 to 20 wt %, even more preferably 0.1 to 10 wt %, per 100 wt % of the total amount of the monomers used in the optical thermoplastic resin according to one or more embodiments of the present invention.

2,2,2-Trifluoroethyl methacrylate is contained in an amount of preferably 10 to 70 wt %, more preferably 20 to 60 wt %, even more preferably 30 to 50 wt %, per 100 wt % of the total amount of the monomers used in the optical thermoplastic resin according to one or more embodiments of the present invention.

(Acrylic Ester)

An acrylic ester is not particularly limited and is preferably one whose alkyl group has 1 to 12 carbon atoms from the viewpoint of polymerizability and cost, and the alkyl group may be linear or branched. Examples of the acrylic ester include methyl acrylate, ethyl acrylate, propyl acrylate, n-butyl acrylate, t-butyl acrylate, 2-ethylhexyl acrylate, benzyl acrylate, dicyclopentanyl acrylate, dicyclopentenyl acrylate, 2,2,2-trifluoroethyl acrylate, 2,2,2-trichloroethyl acrylate, isobornyl acrylate, phenoxyethyl acrylate, pentamethylpiperidinyl acrylate, tetramethylpiperidinyl acrylate, and tetrahydrofurfuryl acrylate. These monomers may be used alone or in combination of two or more of them. In particular, at least one selected from the group consisting of methyl acrylate, ethyl acrylate, and n-butyl acrylate may be preferably used in terms of easily maintaining heat resistance and optical isotropy while improving heat stability.

(Another Copolymerizable Monofunctional Monomer)

Another copolymerizable monofunctional monomer is not particularly limited as long as it is a monofunctional monomer copolymerizable with methacrylic esters or acrylic esters. Examples of the another copolymerizable monofunctional monomer include unsubstituted and/or substituted maleic acids such as maleic acid, citraconic acid, dimethyl maleic acid, dichloromaleic acid, bromomaleic acid, dibromomaleic acid, phenylmaleic acid, and diphenylmaleic acid; unsubstituted and/or substituted maleic acid anhydrides such as maleic anhydride, citraconic anhydride, dimethylmaleic anhydride, dichloromaleic anhydride, bromomaleic anhydride, dibromomaleic anhydride, phenylmaleic anhydride, and diphenylmaleic anhydride; methacrylic acid and salts thereof; acrylic acid and salts thereof; vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride. These monofunctional monomers may be used alone or in combination of two or more of them. Here, "(meth)acrylic" is intended to mean "methacrylic or acrylic".

Among them, unsubstituted and/or substituted maleic acids, (meth)acrylic acid and/or salts thereof are preferably used, and (meth)acrylic acid and/or salts thereof are more preferably used, from the viewpoint of improvements in the heat stability during forming processing and solvent resistance. Examples of the (meth)acrylic acid salt include sodium (meth)acrylate, calcium (meth)acrylate, magnesium (meth)acrylate, and ammonium (meth)acrylate.

When the unsubstituted and/or substituted maleic acids, (meth)acrylic acid and/or its salt is used, the amount used is preferably 0 to 30 wt %, more preferably 0 to 20 wt %, even more preferably 0 to 15 wt %, still even more preferably 0 to 10 wt %, most preferably 0 to 7 wt %, per 100 wt % of the total amount of the monomers used in the optical thermoplastic resin according to one or more embodiments of the present invention.

The presence of a structure derived from the unsubstituted and/or substituted maleic acids or (meth)acrylic acid and/or its salt (hereinafter, referred to as (meth)acrylic acid, etc.) in the optical thermoplastic resin makes it possible to form an acid anhydride structure due to cyclization caused by elimination of alkyl alcohol from a carboxyl group in the (meth)acrylic acid, etc. and an alkyl group of (meth)acrylic acid derivative adjacent to the (meth)acrylic acid, etc. during forming processing. For example, when methyl (meth)acrylate is adjacent to the (meth)acrylic acid, etc., a methanol elimination reaction occurs so that an acid anhydride structure can be formed. Moreover, when benzyl (meth)acrylate is adjacent to the (meth)acrylic acid, etc., a benzyl alcohol elimination reaction occurs so that an acid anhydride structure can be formed. In fact, a free acid may be liberated from even a (meth)acrylic acid salt under high-temperature conditions during forming processing, and thus the structure derived from the (meth)acrylic acid, etc. may be a free acid or may be in the form of a salt such as a magnesium salt, a calcium salt, or an ammonium salt.

The ratio at which the (meth) acrylic acid, etc. are converted to anhydride structures changes depending on heat history such as processing conditions, and all the (meth)acrylic acid does not necessarily have to be converted to acid anhydride structures, and the degree of cyclization may be arbitrarily adjusted depending on desired characteristics.

It should be noted that polyfunctional monomers such as allyl methacrylate, allyl acrylate, triallyl cyanurate, triallyl isocyanurate, diallyl phthalate, diallyl maleate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylolpropane trimethacrylate, trimethylolpropane triacrylate, tetramethylolmethane tetramethacrylate, tetramethylolmethane tetraacrylate, dipropylene glycol dimethacrylate, and dipropylene glycol diacrylate may be used, but it is preferable not to use them from the viewpoint of formability.

Here, as described previously, the magnitude and signs of the orientation (intrinsic) birefringence and the photoelastic constant of the homopolymer composed of various monomers are varied, and it is therefore difficult to set the orientation birefringence and the photoelastic constant in the copolymer composed of two types of monomers to extremely low values. Thus, the optical thermoplastic resin according to one or more embodiments of the present invention is preferably composed of at least three of monomers, i.e., it is more preferred to select at least three from the group consisting of methacrylic ester, acrylic ester, and another monofunctional copolymerizable monomer.

Regarding the amount used of the methacrylic ester, the acrylic ester, and the another monofunctional monomer copolymerizable therewith, the methacrylic ester is used preferably in an amount of 99.9 to 50 wt %, the acrylic ester is used preferably in an amount of 0.1 to 50 wt %, and the another monofunctional monomer copolymerizable therewith is used preferably in an amount of 0 to 40 wt %. Further, it is preferred that the amount used of the methacrylic ester is 99.9 to 70 wt %, the amount used of the acrylic ester is 0.1 to 30 wt %, and the amount used of the another monofunctional monomer copolymerizable therewith is 0 to 20 wt %. In particular, it is preferred that the amount used of the methacrylic ester is 99.9 to 80 wt %, the amount used of the acrylic ester is 0.1 to 20 wt %, and the amount used of the another monofunctional monomer copolymerizable therewith is 0 to 10 wt %.

The optical thermoplastic resin according to one or more embodiments of the present invention has a weight-average molecular weight of preferably 5000 to 5000000, more preferably 10000 to 1000000, even more preferably 20000 to 500000. If the weight average molecular weight is less than 5000, there is a fear that the physical properties, such as mechanical properties, heat resistance, and hardness, of a resulting formed body are deteriorated or the appearance of the resulting formed body is impaired due to bleeding out on the surface of the formed body during high-temperature forming processing. Further, if the weight average molecular weight exceeds 5000000, it becomes difficult to perform the forming because of a too high melt viscosity.

Examples of a polymerization method that can be used to obtain the optical thermoplastic resin according to one or more embodiments of the present invention include common polymerization methods such as cast polymerization, bulk polymerization, suspension polymerization, solution polymerization, emulsion polymerization, living radical polymerization, and anion polymerization. In order to use the optical thermoplastic resin according to one or more embodiments of the present invention as an optical material, mixing of minute foreign matter into the optical thermoplastic resin is preferably avoided as much as possible. From this viewpoint, it is desirable to use cast polymerization, solution polymerization, bulk polymerization, or suspension polymerization.

The temperature and time of the polymerization reaction can be appropriately adjusted depending on the types of monomers used or the ratio between monomers used. For example, the polymerization temperature is 0 to 150° C. and the polymerization time is 0.5 to 24 hours, and preferably, the polymerization temperature is 40 to 150° C. and the polymerization time is 1 to 15 hours.

In a radical polymerization reaction, a polymerization initiator may be added, if necessary. As the polymerization initiator, any initiator commonly used in radical polymerization can be used. Examples of such an initiator include: organic peroxides such as cumene hydroperoxide, diisopropylbenzene hydroperoxide, di-t-butyl peroxide, lauroyl peroxide, benzoyl peroxide, t-butyl peroxy isopropyl carbonate, t-amyl peroxy-2-ethyl hexanoate, and t-butyl peroxy-2-ethylhexanoate, etc.; and azo compounds such as 2,2'-azobis (isobutyronitrile), 1,1'-azobis(cyclohexanecarbonitrile), 2,2'-azobis(2,4-dimethylvaleronitrile), and dimethyl-2,2'-azobisisobutyrate. These polymerization initiators may be used singly or in combination of two or more of them.

The amount of the polymerization initiator to be used is not particularly limited and may be appropriately set depending on the combination of monomers or reaction conditions, but is preferably in the range of 0.005 to 5 wt %.

A molecular weight modifier used in the polymerization reaction, if necessary, is any molecular weight modifier commonly used in radical polymerization. Particularly preferred examples of such a molecular weight modifier include mercaptan compounds such as butyl mercaptan, octyl mercaptan, dodecyl mercaptan, and 2-ethylhexyl thioglycolate. Such a molecular weight modifier is added at a concentration within such a range that the molecular weight is controlled to be within the above range.

When a solvent is used in the polymerization reaction, examples of the polymerization solvent include: aromatic hydrocarbon-based solvents such as toluene, xylene, and ethyl benzene; ketone-based solvents such as methyl ethyl ketone and methyl isobutyl ketone; and ether-based solvents such as tetrahydrofuran. These solvents may be used singly or in combination of two or more of them. The polymerization reaction is preferably performed at a polymer concentration of 10 to 95 wt %, more preferably 75 wt % or less, even more preferably 60 wt % or less to achieve an appropriate viscosity of a reaction liquid from the viewpoint of removing heat during polymerization. When the polymer concentration is 10 wt % or more, the adjustment of molecular weight and molecular weight distribution is easily performed. When the polymer concentration is 95 wt % or less, a polymer having a high molecular weight can be obtained.

From the viewpoint of maintaining an appropriate viscosity of the obtained polymerization reaction liquid, a polymerization solvent can be appropriately added. By maintaining an appropriate viscosity of the reaction liquid, heat removal can be controlled and the generation of microgels in the reaction liquid can be suppressed. Particularly, in the latter half of the polymerization reaction in which the viscosity increases, it is more preferred that the polymer concentration is controlled to be 50 wt % or less by appropriately adding the polymerization solvent.

The mode of appropriately adding the polymerization solvent to the polymerization reaction liquid is not particularly limited. For example, the polymerization solvent may be added continuously or intermittently. By controlling the concentration of the resin formed in the polymerization reaction liquid in this way, the uniformity of temperature in the reactor can be improved and gelation of the reaction liquid can be more sufficiently suppressed. The polymerization solvent to be added may be, for example, the same as or different from a solvent initially charged to perform the polymerization reaction. However, a solvent that is the same as a solvent initially charged to perform the polymerization reaction is preferably used. The polymerization solvent to be added may be a single solvent of only one kind of solvent or a mixed solvent of two or more kinds of solvents.

When the optical thermoplastic resin according to one or more embodiments of the present invention is obtained by suspension polymerization, a suspension agent and, if necessary, an auxiliary suspension agent are added to an aqueous medium. Examples of the suspension agent include: water-soluble polymers such as polyvinyl alcohol, methyl cellulose, polyoxyethylene-polyoxypropylene block copolymer, polyethylene oxide, and polyacrylamide; and inorganic substances such as calcium phosphate and magnesium pyrophosphate. The amount of the water-soluble polymer to be used is preferably 0.01 to 2 wt % with respect to the total weight of monomers, and the amount of the inorganic substance to be used is preferably 0.01 to 2 wt % with respect to the total weight of monomers. Examples of the auxiliary suspension agent include: low-molecular weight surfactants such as anion surfactants such as sodium dodecylbenzene sulfonate, sodium lauryl sulfate, sodium alkyl naphthalene sulfonate, and sodium dialkylsulfosuccinate; and water-soluble inorganic salts such as boric acid, sodium carbonate, disodium hydrogen phosphate, sodium dihydrogen phosphate, and sodium sulfate. The auxiliary suspension agent is preferably disodium hydrogen phosphate or sodium dodecylbenzene sulfonate. When an inorganic substance is used as the suspension agent, the auxiliary suspension agent is preferably used. The auxiliary suspension agent is preferably used in an amount of 0.001 to 2 wt % per 100 wt % of monomers.

The optical thermoplastic resin and its optical resin composition according to one or more embodiments of the present invention may be subjected to forming, such as extrusion forming, injection forming compression forming, blow forming, or spinning forming, directly in the form of particles or after pelletization using an extruder to obtain a formed body having a shape suitable for its intended use. The optical thermoplastic resin and its optical resin composition according to one or more embodiments of the present invention are particularly useful as a film or an injection-formed body, and is successfully processed by, for example, a conventional melt extrusion method such as an inflation method or a T-die extrusion method, a calendaring method, or a solvent casting method, etc., or an injection-forming. Among them, a melt extrusion method using no solvents and an injection-forming are particularly preferred. The use of a melt extrusion method and an injection-forming method makes it possible to reduce production cost or loads to the global environment or working environment caused by solvents.

From the viewpoint of obtaining a formed body that does not exhibit birefringence resulting from forming processing and can be practically, the value of orientation birefringence of the optical thermoplastic resin according to one or more embodiments of the present invention is preferably $-1.7 \times 10^{-4}$ to $1.7 \times 10^{-4}$, more preferably $-1.6 \times 10^{-4}$ to $1.6 \times 10^{-4}$, even more preferably $-1.5 \times 10^{-4}$ to $1.5 \times 10^{-4}$, yet even more preferably $-1.0 \times 10^{-4}$ to $1.0 \times 10^{-4}$, especially preferably $-0.5 \times 10^{-4}$ to $0.5 \times 10^{-4}$, most preferably $-0.2 \times 10^{-4}$ to $0.2 \times 10^{-4}$.

From the viewpoint of obtaining a formed body whose birefringence resulting from the application of stress in an environment of, for example, high temperature and high humidity is low, the photoelastic constant of the optical thermoplastic resin according to one or more embodiments of the present invention is preferably $-3.7 \times 10^{-12}$ to $3.7 \times 10^{-12}$ $Pa^{-1}$, furthermore preferably $-2 \times 10^{-12}$ to $2 \times 10^{-12}$ $Pa^{-1}$, even more preferably $-1.5 \times 10^{-12}$ to $1.5 \times 10^{-12}$ $Pa^{-1}$, yet even more preferably $-1 \times 10^{-12}$ to $1 \times 10^{-12}$ $Pa^{-1}$, particularly preferably $-0.5 \times 10^{-12}$ to $0.5 \times 10^{-12}$ $Pa^{-1}$, most preferably $-0.3 \times 10^{-12}$ to $0.3 \times 10^{-12}$ $Pa^{-1}$. When the optical resin composition having a photoelastic constant of $-3.7 \times 10^{-12}$ to $3.7 \times 10^{-12}$ $Pa^{-1}$ is formed into a film and the film is used in a liquid crystal display device, a reduction in the contrast of peripheral area of a display screen and light leakage do not occur, or even when the film is used in an optical member such as a lens, optical defects such as a phase difference variation and a image focus deviation do not occur.

From the viewpoint of ensuring a sufficient heat stability during forming processing, the optical thermoplastic resin according to one or more embodiments of the present invention has a rate of reduction in melt viscosity of preferably less than 20%, more preferably less than 17%, even more preferably less than 13%. The rate of reduction in melt viscosity as used herein refers to the ratio of the melt viscosity at a dwell time of 1 hour to the melt viscosity at a dwell time of 10 minutes under the conditions according to JIS K7199. Specific measurement method and calculation method will be described later.

As described above, the formed body obtained from the optical thermoplastic resin according to one or more embodiments of the present invention can be used as an optical film or an optical injection-formed body such as a lens. In this case, it is preferable that the optical anisotropy of the formed body is small, and that the optical isotropy in the in-plane direction (length and width directions) is small. Furthermore, when the formed body is used as a polarizer protective film, it is preferable that the optical anisotropy of the film is preferably low not only in its in-plane direction (length and width directions) but also in its thickness direction. In other words, both the absolute value of the in-plane phase difference and the absolute value of the thickness-direction phase difference are preferably small. More specifically, the in-plane phase difference is preferably 10 nm or less, more preferably 6 nm or less, even more preferably 5 nm or less, even more preferably 3 nm or less. The absolute value of the thickness-direction phase difference is preferably 50 nm or less, more preferably 20 nm or less, even more preferably 10 nm or less, most preferably 5 nm or less. The film having such a phase difference can be preferably used as a polarizer protective film of a polarizing plate in a liquid crystal display device. On the other hand, if the film having an in-plane phase difference exceeding 10 nm or a thickness-direction phase difference absolute value exceeding 50 nm is used as a polarizer protective film of a polarizing plate in a liquid crystal display device, there is a case where a reduction in the contrast of the liquid crystal display device occurs.

Phase difference is an index value calculated based on birefringence, and in-plan phase difference (Re) and thickness-direction phase difference (Rth) can be calculated by the following formulas, respectively. In the case of an ideal film that is completely optically isotropic in three dimensional directions, its in-plane phase difference Re and thickness-direction phase difference Rth are both 0.

$$Re = (nx - ny) \times d$$

$$Rth = ((nx + ny)/2 - nz) \times d$$

In the above formulas, nx, ny, and nz represent a refractive index in an X-axis direction that is an in-plane stretching direction (orientation direction of polymer chains), a refractive index in a Y-axis direction that is a direction perpendicular to the X axis, and a refractive index in a Z-axis direction that is a film thickness direction, respectively; d represents a film thickness; and nx−ny represents orientation birefringence. It is to be noted that in the case of a melt-extruded film, MD direction corresponds to the X axis, and in the case of a stretched film, a stretching direction corresponds to the X axis.

The formed body obtained from the optical thermoplastic resin according to one or more embodiments of the present invention (formed body of the invention) is characterized by excellent transparency and has a haze value of 1% or less when the thickness in the formed body is 2 mm. The haze value of the formed body is more preferably 0.8% or less, even more preferably 0.6% or less, yet even more preferably 0.4% or less, especially preferably 0.3% or less. When the formed body according to one or more embodiments of the present invention has a haze value within the above range, its transparency is sufficiently high and therefore the formed body is suitable for optical applications requiring transparency.

The formed body according to one or more embodiments of the present invention preferably has a total light transmittance of 85% or higher, more preferably 88% or higher, even more preferably 90% or higher, especially preferably 92% or higher when the formed body has a thickness of 2 mm. When the formed body according to one or more embodiments of the present invention has a total light transmittance within the above range, its transparency is sufficiently high and therefore the formed body is suitable for optical applications, decorative applications, interior applications, or vacuum forming applications requiring transparency.

Further, in the formed body according to one or more embodiments of the present invention, it has a preferred color tone, for example, a transmitted YI (yellowness index) of 5 or less, more preferably 3 or less, even more preferably 2 or less, yet even more preferably 1.5 or less, yet furthermore preferably 1.0 or less, especially preferably 0.8 or less.

The formed body according to one or more embodiments of the present invention has a glass transition temperature of preferably 80° C. or higher, more preferably 85° C. or higher, even more preferably 90° C. or higher, yet even more preferably 100° C. or higher, yet furthermore preferably 115° C. or higher, still furthermore preferably 120° C. or higher, most preferably 124° C. or higher. When the glass transition temperature is within the above range, the formed body according to one or more embodiments of the present invention having a sufficiently high heat resistance can be obtained.

The optical resin composition according to one or more embodiments of the present invention is not particularly limited as long as it contains the optical thermoplastic resin according to one or more embodiments of the present invention, and one or more other resins may be added thereto without any particular limitation. For example, it is also possible to blend thermoplastic resins such as maleimide acrylic resins, polyglutarimide acrylic resins, glutaric anhydride acrylic resins, acrylic resins having a lactone ring, methacrylic resins, hydroxyl group- and/or carboxyl group-containing acrylic resins, polyethylene terephthalate resins, and polybutylene terephthalate resins; impact modifiers made of multi-layered polymers such as core-shell polymers and graft copolymers; thermoplastic elastomers such as block polymers; or the like. The method of blending is not particularly limited, and a known method may be used for such blending.

The optical resin composition according to one or more embodiments of the present invention may be blended with birefringent inorganic microparticles described in Japanese Patent No. 3648201 or Japanese Patent No. 4336586 or a birefringent low-molecular compound having a molecular weight of 5000 or less, preferably 1000 or less described in Japanese Patent No. 3696649 to adjust orientation birefringence.

If necessary, the optical resin composition according to one or more embodiments of the present invention may contain a known additive. Examples of the additive include light stabilizers, UV absorbers, heat stabilizers, delustrants, light diffusers, colorants, dyes, pigments, antistatic agents, heat reflecting agents, lubricants, plasticizers, UV absorbers, stabilizers, and fillers.

When the optical resin composition according to one or more embodiments of the present invention is made into a formed body having a thickness of 2 mm, its preferred color tone has, for example, preferably a transmitted YI (yellowness index) of 5 or less, more preferably 3 or less, even more preferably 2 or less, yet even more preferably 1.5 or less, still furthermore preferably 1.0 or less, especially preferably 0.8 or less.

If necessary, the surface gloss of the film obtained from the optical thermoplastic resin or the optical resin composition according to one or more embodiments of the present invention (the film of the invention) may be reduced by a known method. This can be achieved for example by the method including kneading inorganic fillers or cross-linked polymer particles with the optical thermoplastic resin. Alternatively, a film obtained may be embossed to reduce its surface gloss.

The film according to one or more embodiments of the present invention may be laminated on a metal or plastic. Examples of a method for laminating the film include lamination forming, wet lamination in which an adhesive is applied onto a metal plate such as a steel plate and then the film is laminated on and bonded to the metal plate by drying, dry lamination, extrusion lamination, and hot-melt lamination.

Examples of a method for laminating the film on a plastic part include insertion forming or laminate injection press forming in which a resin is injected into a mold in which a film is provided and in-mold forming in which a resin is injected into a mold in which a pre-formed film is provided. An article on which the film according to one or more embodiments of the present invention is laminated can be used as, for example, front panels of liquid crystal displays of terminal equipment such as mobile phones, smartphones, and tablets; optical applications for parts of electric or electronic devices; substitutes for paint such as car interior materials and car exterior materials; building materials such as window frames, bathroom fitments, wallpapers, and floor materials; daily goods; housings for furniture or electrical equipment; housings for OA equipment such as facsimiles, laptop computers, and copy machines; and the like.

The optical thermoplastic resin or the optical resin composition according to one or more embodiments of the present invention is suitable for optical applications for its excellent properties in transparency, color tone, optical isotropy, and heat stability. However, the present disclosure is not limited to optical applications, and the optical thermoplastic resin or the optical resin composition can also be used for the following various applications. More specifically, the film according to the present disclosure can be used for interior and exterior of cars, personal computers, mobile devices, solar batteries, and the like; solar battery backsheets; taking lenses for cameras, VTRs, and projectors; finders, filters, prisms, Fresnel lenses, and the like for use in the field of imaging; lenses such as pick-up lenses for optical disc in CD players, DVD players, MD players, and the like for use in the field of lens; optical discs such as CDs, DVDs, and MDs for use in the field of optical recording; films for liquid crystal displays such as light guide plates, diffuser plates, backsheets, reflection sheets, polarizer protective films, polarizing films, transparent resin sheets, phase difference films, light diffusing films, prism sheets, and the like and organic EL films and surface protective films for use in the field of information devices; optical fibers, optical switches, optical connectors, and the like for use in the field of optical communications; car headlights, tail lamp lenses, inner lenses, instrument covers, sunroofs, and the like for use in the field of vehicles; display-related members such as head-up display (for example, front plate); medical devices such as eyeglasses, contact lenses, lenses for endoscopes, and medical supplies requiring sterilization for use in the medical field; road signs, bathroom fitments, floor materials, translucent panels for roads, lenses for double glazing, lighting windows, carports, lenses for lighting, lighting covers, sidings for construction materials, and the like for use in the fields of architecture and construction materials; microwave cooking vessels (dishes); housings for home appliances; toys; sunglasses; and stationary, etc. The film according to one or more embodiments of the present invention can be used also as a substitute for a formed article using a transfer foil sheet.

A formed body, other than a film, made of the optical thermoplastic resin or the optical resin composition according to one or more embodiments of the present invention can be used as, for example, lenses such as lenses for common cameras, lenses for video cameras, object lenses, diffraction gratings, holograms, and collimators for laser pickup, fθ lenses for laser printers, cylindrical lenses, condenser lenses or projector lenses for liquid crystal projectors, Fresnel lenses, and lenses for eyeglasses, disc substrates for compact discs (e.g., CDs and CD-ROMs), mini discs (MDs), and DVDs, members for liquid crystal elements such as light guide plates for LCDs, films for LCDs, substrates for LCDs, and adhesives for bonding liquid crystal elements, organic EL members, screens for projectors, optical filters, optical fibers, optical waveguides, prisms, lenses for lighting, car headlights, medical supplies requiring sterilization, microwave cooking vessels, housings for home appliances, toys, and recreation items.

The film according to one or more embodiments of the present invention may be bonded to a polarizer to be used as a polarizing plate. That is, the film according to one or more embodiments of the present invention may be used as a polarizer protective film of a polarizing plate. The polarizer is not particularly limited and may be any conventionally-known polarizer. A specific example of such a polarizer is iodine-doped stretched polyvinyl alcohol.

If necessary, the film according to one or more embodiments of the present invention may be subjected to surface treatment. For example, when subjected to surface finishing such as coating or laminated on the surface of another film, the film according to one or more embodiments of the present invention is preferably subjected to surface treatment. By subjecting the film according to one or more embodiments of the present invention to such surface treatment, it is possible to improve adhesion between the film according to one or more embodiments of the present invention and a coating material or another film to be laminated.

It is to be noted that the purpose of surface treatment of the film according to one or more embodiments of the present invention is not limited to the above purposes. The film according to one or more embodiments of the present invention may be subjected to surface treatment regardless of its intended use. Such surface treatment is not particularly limited, and examples thereof include corona treatment, plasma treatment, ultraviolet irradiation, and alkali treatment. Among them, corona treatment is preferred.

The thickness of the film according to one or more embodiments of the present invention is not particularly limited, but is preferably 500 μm or less, more preferably 300 μm or less, particularly preferably 200 μm or less. Further, the thickness of the film according to one or more embodiments of the present invention is preferably 10 μm or more, more preferably 30 μm or more, even more preferably 50 μm or more, particularly preferably 100 μm or more. The film according to one or more embodiments of the present invention having a thickness within the above range is advantageous in that the film is less likely to be deformed when subjected to vacuum forming and therefore a deep-drawn portion is less likely to be broken, and can have uniform optical characteristics and excellent transparency. On the other hand, if the thickness of the film exceeds the above upper limit, the film after forming is non-uniformly cooled and therefore tends to have non-uniform optical characteristics. If the thickness of the film is less than the above lower limit, there is a case where the film is difficult to handle.

EXAMPLES

Hereinbelow, the present invention will be described more specifically with reference to examples, but is not limited to these examples. In the following description, "part(s)" and "%" represent "part(s) by weight" and "wt %", respectively unless otherwise specified.

(Polymerization Conversion Ratio)

First, part of the obtained slurry was sampled and accurately weighed, dried in a hot-air drier at 120° C. for 1 hour, and then accurately weighed to determine the weight of solid matter. Then, the ratio between the results of accurate measurement before and after drying was determined as the solid content of the slurry. Finally, a polymerization conversion ratio was calculated by the following formula using the solid content. It is to be noted that in this calculation formula, a chain transfer agent was regarded as a monomer charged.

Polymerization conversion ratio(%)=[(total weight of raw materials charged×solid content −total weight of raw materials other than water·monomers)/weight of monomers charged]×100

(Molecular Weight Measurement)

The molecular weight was calculated by a standard polystyrene conversion method using a gel permeation chromatography (GPC). In the present invention, the measurement was carried out using a high-speed GPC apparatus (HLC-8220GPC, manufactured by Tosoh Corporation), a column (TSKguardcolumn SuperHZ-H, manufactured by Tosoh Corporation) and tetrahydrofuran as a GPC solvent.

(Glass Transition Temperature)

The temperature of a sample was once increased to 200° C. at a rate of 25° C./min by a differential scanning calorimetry (DSC)SSC-5200 manufactured by Seiko Instruments Inc., held at 200° C. for 10 minutes, and decreased to 50° C. at a rate of 25° C./min to preliminarily adjust the temperature of the sample, and then the DSC curve of the sample was measured while the temperature of the sample was increased to 200° C. at a temperature rise rate of 10° C./min. The integral of the obtained DSC curve (DDSC curve) was determined, and the glass transition temperature of the sample was determined from the maximum point of the DDSC curve.

(Total Light Transmittance·Haze Value)

The total light transmittance and haze value of an unstretched original film having a thickness of 125 μm and an injection-formed body were measured by a method specified in JIS K7105 using NDH-300A manufactured by NIPPON DENSHOKU INDUSTRIES CO., LTD.

(Film Thickness)

The thicknesses of a film and an injection-formed body were measured using a digimatic indicator manufactured by Mitutoyo Corporation.

(Formation of Uniaxially-Stretched Film (Stretched Twice) and Measurement of Orientation Birefringence)

A 25 mm×90 mm test specimen was cut out from an unstretched original film having a thickness of 125 μm (so that its longitudinal direction was parallel to MD), both the short sides of the test specimen were held while the test specimen was maintained at a temperature higher by 30° C. than its glass transition temperature for 2 minutes, and the test specimen was uniaxially stretched twice (also referred to as "stretched 100%") at a rate of 200 mm/min in the longitudinal direction (at this time, both the long sides of the test specimen were not fixed). Thereafter, the thus obtained film was cooled to 23° C., and a sample was taken from the central portion of the film to measure birefringence (orientation birefringence) with the use of an automatic double refraction meter (KOBRA-WR manufactured by Oji Scientific Instruments) at a temperature of 23±2° C., a humidity of 50±5%, a wavelength of 590 nm, and an incidence angle of 0°. At the same time, in-plane phase difference Re and thickness-direction phase difference Rth (incidence angle: 40° C.) were also measured (measurement of in-plane phase difference Re and thickness-direction phase difference Rth will be described in detail later).
(Orientation Birefringence of Original Film and Injection-Formed Body)

A 40 mm×40 mm test specimen was cut out from an unstretched original film (thickness: 125 µm), and the orientation birefringence of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re and the thickness-direction phase difference Rth (incidence angle: 40°) of the test specimen were also measured (measurement of in-plane phase difference Re and thickness-direction phase difference Rth will be described in detail later). In the case of an injection-formed body, a 15 mm×90 mm test specimen was cut out from the central portion of the injection-formed body (a thickness of 2 mm and a size of 15 cm×10 cm) (so that the long side 90 mm is in the longitudinal direction) and the orientation birefringence was similarly measured.

A 40 mm×40 mm test specimen was cut out from an original film having a thickness of 125 µm. The in-plane phase difference Re was measured using an automatic double refraction meter (KOBRA-WR manufactured by Oji Scientific Instruments) at a temperature of 23±2° C., a humidity of 50±5%, a wavelength of 590 nm, and an incidence angle of 0°. In the case of an injection-formed body, a 15 mm×90 mm test specimen was cut out from the central portion of the injection-formed body (a thickness of 2 mm and a size of 15 cm×10 cm) (so that the long side 90 mm is in the longitudinal direction), and the Re and Rth were similarly measured.

From the thickness d of the test specimen measured using a digimatic indicator (manufactured by Mitutoyo Corporation), the refractive index n measured using an Abbe refractometer (3T manufactured by ATAGO CO., LTD.), and the in-plane phase difference Re and the phase difference in a direction inclined at 40° measured using the automatic double refraction meter at a wavelength of 590 nm, three-dimensional refractive indexes nx, ny, and nz were determined to calculate a thickness-direction phase difference, $Rth=((nx+ny)/2-nz)\times d$. It is to be noted that the measured value was multiplied by 100 (µm)/film thickness (µm) to be converted to a value per 100 µm thickness, and the thus obtained value is shown in Table 3.

(Photoelastic Constant)

A strip-shaped test specimen of 15 mm×90 mm was cut out from an unstretched original film having a thickness of 125 µm (so that its long side was in the TD direction). The photoelastic constant of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. The measurement was performed in the following manner: one of the long sides of the film was fixed and birefringence was measured while a load applied to the other long side was increased from 0 kgf to 4 kgf by 0.5-kgf increments, and from the obtained results, the magnitude of a change in birefringence per unit stress was determined. In the case of an injection-formed body, a 15 mm×90 mm test specimen was cut out from the central portion of the injection-formed body (a thickness of 2 mm and a size of 15 cm×10 cm) (so that the long side 90 mm is in the longitudinal direction), and the photoelastic constant was similarly measured.

(Heat Stability)

The heat stability was evaluated by the rate of reduction in melt viscosity and foamability of the formed body.
•Rate of Reduction in Melt Viscosity The melt viscosity of an obtained resin composition was measured under conditions specified in JIS K7199 (die temperature: 260° C., shear rate: 24 sec$^{-1}$, capillary die diameter: 1 mm, dwell time: 1 hour), and the rate of reduction in melt viscosity was calculated by the following calculation formula from the melt viscosity at a dwell time of 10 minutes and the melt viscosity at a dwell time of 1 hour, and was regarded as an indicator of heat stability. After the test, a strand was observed to determine the presence or absence of foaming due to thermal decomposition of the resin.

Ratio of reduction in melt viscosity=(melt viscosity at a dwell time of 10 minutes−melt viscosity at a dwell time of 1 hour)/(melt viscosity at a dwell time of 10 minutes)×100 (%)

The heat stability was evaluated according to the following criteria: Heat stability:
○: No foaming was observed in the strand
×: Foaming was observed in the strand
• Foaming of formed body The presence or absence of foaming in an extruded film or an injection-formed body was confirmed.
○: No foaming was observed in the extruded film or injection-formed body
×: Foaming was observed in the extruded film or injection-formed body
(Appearance of Formed Body)

The appearance of the formed body was evaluated by observing the presence or absence of die lines in the film having a thickness of 125 µm.
○: Absence of die lines in the film
×: Presence of die lines in the film
(Impact Resistance)

According to ASTM D-256, the impact resistance was evaluated by Izod test (temperature of 23° C., 50% humidity).

(Transmitted YI (Yellowness Index))

Using a colorimeter (ZE-2000 manufactured by NIPPON DENSHOKU INDUSTRIES CO., LTD.) according to JIS Z8722, a transmitted yellowness index was measured. A flat-plate sample having a thickness of 2 mm manufactured by injection forming was used.

Example 1

Into an 8-liter glass reactor equipped with an H-shaped stirrer were fed 200 parts of deionized water and 0.5 part of disodium hydrogen phosphate. Then while stirring at 300 rpm, 100.75 parts of a raw material mixture of an optical resin A1 shown in Table 2 was added to the reactor. The temperature was raised to 70° C. while purging the air in the reactor with nitrogen gas, and polymerization was initiated. Adeka Pluronic F-68 (polyoxyethylene-polyoxypropylene block copolymer, manufactured by ADEKA Corporation Ltd.) in an amount of 0.06 part as a nonionic suspension stabilizer was added thereto 35 minutes after the temperature reached 70° C. After that, the reaction was performed for further 95 minutes at 70° C., and the temperature was raised to 80° C. Then, the reaction mixture was stirred for 3 hours to complete the polymerization. The polymerization conversion ratio was 99.3%. The obtained polymer was washed 4 times with 3-fold amount of deionized water relative to the resin amount and dried to obtain bead-like suspension polymer particles A1. The Mw of the obtained polymer was 143000.

Comparative Example 1

Into an 8-liter glass reactor equipped with an H-shaped stirrer were fed 200 parts of deionized water and 0.5 part of disodium hydrogen phosphate. Then while stirring at 300 rpm, 100.75 parts of a raw material mixture of an optical resin A2 shown in Table 2 was added to the reactor. The temperature was raised to 70° C. while purging the air in the reactor with nitrogen gas, and polymerization was initiated. Adeka Pluronic F-68 (polyoxyethylene-polyoxypropylene block copolymer, manufactured by ADEKA Corporation Ltd.) in an amount of 0.06 part as a nonionic suspension stabilizer was added thereto 35 minutes after the temperature reached 70° C. After that, the reaction was performed for further 95 minutes at 70° C., and the temperature was raised to 80° C. Then, the reaction mixture was stirred for 3 hours to complete the polymerization. The polymerization conversion ratio was 99.1%. The obtained polymer was washed 4 times with 3-fold amount of deionized water relative to the resin amount and dried to obtain bead-like suspension polymer particles A2. The Mw of the obtained polymer was 153000.

TABLE 2

|  | Example 1 | Comparative Example 1 | Example 4 | Example 5 |
|---|---|---|---|---|
| Optical thermoplastic resin | A1 | A2 | A4 | A5 |
| Content of monofunctional monomer (parts) | 100 | 100 | 100 | 100 |
| Methyl methacrylate (%) | 47 | 52 | 49 | 51 |
| n-Butyl acrylate (%) | 5 |  |  |  |
| Methyl acrylate (%) |  |  | 3 | 1 |
| Benzyl methacrylate (%) | 6 | 6 | 6 | 6 |
| 2,2,2-Trifluoroethyl methacrylate (%) | 42 | 42 | 42 | 42 |
| 2-Ethylhexyl thioglycolate (part) | 0.25 | 0.25 | 0.35 | 0.35 |
| Perbutyl O (part)* | 0.5 | 0.5 | 0.5 | 0.5 |

*Perbutyl O: t-Butyl peroxy-2-ethylhexanoate, manufactured by NOF Corporation

Example 2, Comparative Example 2

An optical resin shown in Table 2 was supplied at a rate of 10 kg/hr to a single screw extruder having a full-flight screw with a diameter of 40 mm. The preset temperature of temperature control zone of the extruder was 255° C. and the screw rotation speed of the extruder was 52 rpm. The resin extruded as a strand through a die provided at the outlet of the extruder was cooled in a water tank and pelletized by a pelletizer to obtain pellets.

The obtained pellets were supplied at a rate of 10 kg/hr to a single screw extruder connected to a T-die at the outlet thereof and melt-extruded to obtain a film having a thickness shown in Table 3. The preset temperature of temperature control zone of the extruder was 260° C. and the screw rotation speed of the extruder was 20 rpm. Various physical properties of the film were evaluated. The measurement results are shown in Table 3.

TABLE 3

|  |  |  | Example 2 | Comparative Example 2 |
|---|---|---|---|---|
|  | Optical thermoplastic resin | Type | A1 | A2 |
|  |  | (parts) | 100 | 100 |
| Film physical properties | Forming method |  | Melt-extrusion | Melt-extrusion |
|  | Film thickness | (μm) | 125 | 125 |
|  | Glass transition temperature | (° C.) | 88 | 99 |
|  | Total light transmittance | (%) | 92.2 | 92.2 |
|  | Haze value | (%) | 0.5 | 0.5 |
| Appearance | Die line |  | ○ | X |
| Heat stability | Rate of reduction in melt viscosity | (%) | −15 | −40 |
|  | Foaming in strand |  | ○ | X |
|  | Foamability |  | ○ | X |
| Unstretched | Photoelastic constant (×10$^{-12}$) | (Pa$^{-1}$) | 0.15 | −0.47 |
|  | Orientation birefringence (×10$^{-4}$) |  | ±0.01 | 0.04 |
|  | Re (per 100 μm) | nm | ±0.1 | 0.4 |
|  | Rth (per 100 μm) | nm | 0.2 | −0.2 |

TABLE 3-continued

|  |  |  | Example 2 | Comparative Example 2 |
|---|---|---|---|---|
| Stretched twice | Orientation birefringence $(\times 10^{-4})$ |  | 0.15 | 0.2 |
|  | Re (per 100 μm) | nm | 1.5 | 2.0 |
|  | Rth (per 100 μm) | nm | −1.0 | −0.4 |

* The symbol "±" means that the sign could not be identified.

Example 3 and Comparative Examples 3 and 4

An injection-formed body was prepared using each optical thermoplastic resin obtained in Example 1 and Comparative Example 1. In Comparative Example 4, as an optical thermoplastic resin, the following A3 was used in an amount of 100 parts by weight.
A3: PMMA resin (MMA/MA=96/4 (weight ratio)) SUMIPEX EX (Sumitomo Chemical Co., Ltd.) Each of the optical thermoplastic resin as shown in Table 4 was kneaded in and extruded from a vent-equipped single screw extruder (HW-40-28 manufactured by TABATA Industrial Machinery Co., Ltd., 40 m/m, L/D=28) at preset temperatures of C1 to C3 of 200° C., a preset temperature of C4 of 210° C., a preset temperature of C5 of 220° C., and a preset temperature of D of 230° C. and pelletized to obtain pellets. The obtained pellets were dried at 90° C. for 3 hours or longer and then subjected to injection-forming using an injection forming machine (Model 160MSP-10 manufactured by Mitsubishi Heavy Industries, Ltd.) at a cylinder temperature T3 of 230° C., a cylinder temperature T2 of 240° C., a cylinder temperature T1 of 250° C., a nozzle temperature N of 255° C., an injection rate of 19.7%, and a mold temperature of 60° C. to obtain a flat plate sample having a thickness of 2 mm and a size of 15 cm×10 cm. The total light transmittance and haze of the obtained flat plate sample were measured as indicators of transparency.

Further, ¼-inch test pieces were prepared at the same injection forming temperature to evaluate impact resistance. The results are shown in Table 4.

Example 4

Into an 8-liter glass reactor equipped with an H-shaped stirrer were fed 200 parts of deionized water and 0.5 part of disodium hydrogen phosphate. Then while stirring at 300 rpm, 100.85 parts of a raw material mixture of an optical resin A4 shown in Table 2 was added to the reactor. The temperature was raised to 70° C. while purging the air in the reactor with nitrogen gas, and polymerization was initiated. Adeka Pluronic F-68 (polyoxyethylene-polyoxypropylene block copolymer, manufactured by ADEKA Corporation Ltd.) in an amount of 0.06 part as a nonionic suspension stabilizer was added thereto 35 minutes after the temperature reached 70° C. After that, the reaction was performed for further 110 minutes at 70° C., and the temperature was raised to 80° C. Then, the reaction mixture was stirred for 3 hours to complete the polymerization. The polymerization conversion ratio was 99.1%. The obtained polymer was washed 4 times with 3-fold amount of deionized water relative to the resin amount and dried to obtain bead-like suspension polymer particles A4. The Mw of the obtained polymer was 577700.

Example 5

Into an 8-liter glass reactor equipped with an H-shaped stirrer were fed 200 parts of deionized water and 0.5 part of disodium hydrogen phosphate. Then while stirring at 300 rpm, 100.85 parts of a raw material mixture of an optical resin A5 shown in Table 2 was added to the reactor. The temperature was raised to 70° C. while purging the air in the reactor with nitrogen gas, and polymerization was initiated. Adeka Pluronic F-68 (polyoxyethylene-polyoxypropylene block copolymer, manufactured by ADEKA Corporation Ltd.) in an amount of 0.06 part as a nonionic suspension stabilizer was added thereto 35 minutes after the temperature reached 70° C. After that, the reaction was performed for further 110 minutes at 70° C., and the temperature was raised to 80° C. Then, the reaction mixture was stirred for 3 hours to complete the polymerization. The polymerization conversion ratio was 99.1%. The obtained polymer was washed 4 times with 3-fold amount of deionized water relative to the resin amount and dried to obtain bead-like suspension polymer particles A5. The Mw of the obtained polymer was 733000.

Examples 6 and 7

An injection-formed body (flat plate samples) was prepared in the same manner as in Example 3, except that the optical thermoplastic resins A4 and A5 obtained in Examples 4 and 5 were used. The total light transmittance and haze of the flat plate sample were measured. Further, a ¼-inch test piece was prepared at the same injection-forming temperature to evaluate impact resistance. The results are shown in Table 4.

TABLE 4

|  |  |  |  | Example | | | Comparative Example | |
|---|---|---|---|---|---|---|---|---|
|  |  |  |  | 3 | 6 | 7 | 3 | 4 |
|  |  | Optical thermoplastic resin | Type | A1 | A4 | A5 | A2 | A3 |
|  |  |  | (parts) | 100 | 100 | 100 | 100 | 100 |
| Physical | | Film thickness | (mm) | 2 | 2 | 2 | 2 | 2 |
| properties | | Glass transition temperature | (° C.) | 88 | 95 | 99 | 99 | 108 |
| of | Heat | Rate of reduction |  | −15 | −16 | −19 | −40 | −19 |
| injection- | stability | in melt viscosity |  |  |  |  |  |  |
| formed | | Foaming in strand |  | ○ | ○ | ○ | x | ○ |
| body | | Foamability |  | ○ | ○ | ○ | x | ○ |

TABLE 4-continued

|  |  |  | Example | | | Comparative Example | |
| --- | --- | --- | --- | --- | --- | --- | --- |
|  |  |  | 3 | 6 | 7 | 3 | 4 |
|  | Total light transmittance | (%) | 92.4 | 92.7 | 92.7 | — | 92.3 |
|  | Haze value | (%) | 0.8 | 0.6 | 0.7 | — | 0.6 |
|  | Transmitted YI |  | 0.8 | 0.7 | 0.7 | — | 0.8 |
| Impact resistance | Izod test (1/4-inch bar) | kJ/m$^2$ | 1.8 | 1.8 | 1.8 | — | 1.8 |
| Flat plate | Orientation birefringence | (×10$^{-4}$) | ±0.01 | 0.02 | 0.01 | — | −0.30 |
|  | Re | nm | ±0.1 | 3.4 | 2.6 | — | −60.0 |
|  | Photoelastic constant (×10$^{-12}$) | (Pa$^{-1}$) | 0.15 | 0.58 | 0.47 | — | −3.84 |
|  | Orientation birefringence (Crossed Nicols test, Presence or absence of light leakage) |  | Absent | Absent | Absent | — | Present |

*A formed body that can be accurately evaluated could not be obtained because terrible foaming occurred in Comparative Example 1.
*The symbol "±" means that the sign could not be identified.

From the results in Table 3, it can be seen that a film more excellent in heat stability and surface appearance is obtained from the optical thermoplastic resin of Example 1 as compared to that from the thermoplastic resin of Comparative Example 1.

From the results of Table 4, it can be seen that the flat plate samples obtained in Examples 3, 6 and 7 are lower in orientation birefringence and photoelastic constant and are more excellent in optical isotropy as compared to the flat plate sample obtained in Comparative Example 4. It is to be noted that the flat plate sample obtained in Comparative Example 3 using the optical thermoplastic resin of Comparative Example 1 was poor in heat stability and failed to evaluate because of its frequent occurrence of foaming.

Figure 1:
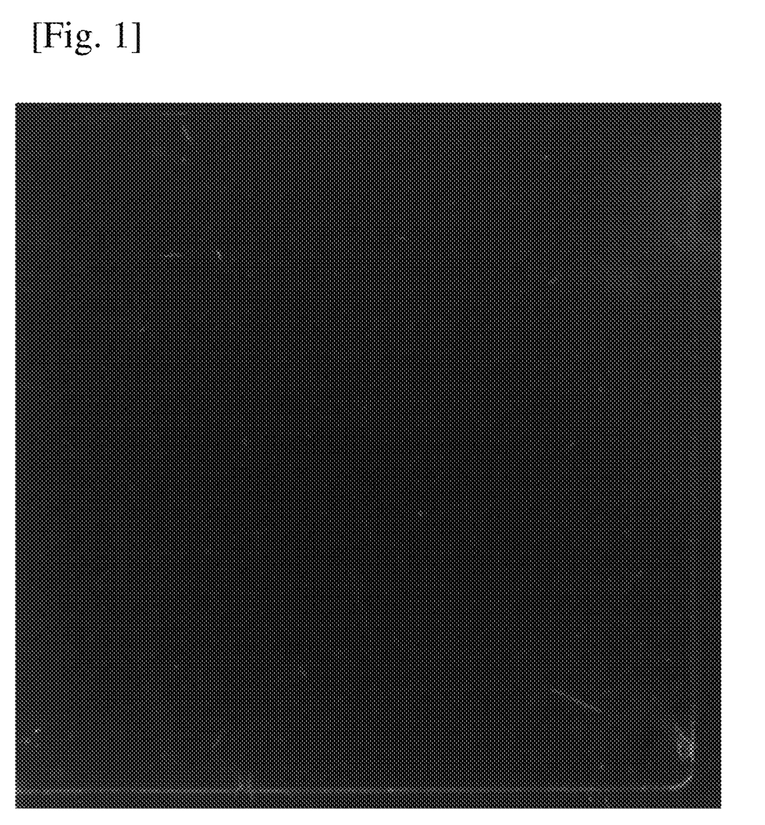
FIG. 1 is a photograph showing the result of a crossed Nicols test in Example 3.
Figure 2:
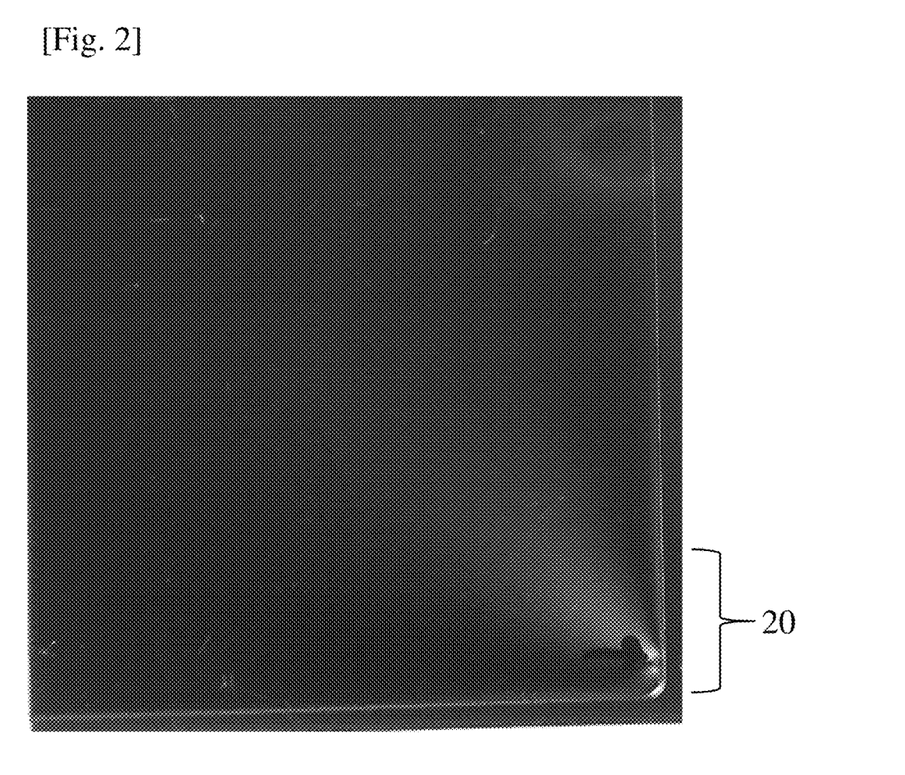
FIG. 2 is a photograph showing the result of a crossed Nicols test in Comparative Example 4.

Further, in order to compare phase differences (Re) in the obtained whole flat plate samples, a crossed Nicols test was performed, in which each of the flat plate samples (a thickness of 2 mm and a size of 15 cm×10 cm) was placed between two polarizing plates orthogonal to each other to determine whether transmitted light was observed (presence or absence of light leakage). FIGS. 1 and 2 are photographs showing the results of the crossed Nicols test for Example 3 and Comparative Example 4, respectively. In general, when a resin is injection-formed, the resin is likely to be oriented particularly in the vicinity of a gate so that light leakage resulting from orientation birefringence is likely to occur. For example, in FIG. 2, Comparative Example 4 shows light leakage, indicated by lighter contrast, in the bottom right corner of the image. The general area of the light leakage is indicated by 20.

On the other hand, as shown in FIG. 1, such light leakage was hardly observed in the case of the flat plate sample made of the optical resin composition according to the present invention (Example 1). That is, the optical resin composition according to the present invention is suitable as a material of an optical film, or of an injection-formed body for optical use such as a lens, a pick-up lens, a lens array, or a display material (e.g. head-up display), required to have very high optical isotropy.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical thermoplastic resin, comprising:
   a methacrylic ester structural unit including methyl methacrylate and at least one selected from the group consisting of benzyl methacrylate, dicyclopentanyl methacrylate, 2,2,2-trifluoroethyl methacrylate, and phenoxyethyl methacrylate;
   wherein the optical thermoplastic resin has a rate of reduction in melt viscosity of less than 20%, an orientation birefringence of $-1.7\times10^{-4}$ to $1.7\times10^{-4}$, a photoelastic constant of $-2\times10^{-12}$ to $2\times10^{-12}$ Pa$^{-1}$, and, when formed into a 2 mm-thick formed body, having a haze of 1% or less.

2. The optical thermoplastic resin according to claim 1, wherein the optical thermoplastic resin further comprises an acrylic ester structural unit.

3. An optical thermoplastic resin, comprising:
   a methacrylic ester structural unit containing (i) at least one selected from the group consisting of benzyl methacrylate, dicyclopentanyl methacrylate, and phenoxyethyl methacrylate; (ii) 2,2,2-trifluoroethyl methacrylate; and (iii) methyl methacrylate; and
   an acrylic ester structural unit,
   wherein the optical thermoplastic resin has an orientation birefringence of $-1.7\times10^{-4}$ to $1.7\times10^{-4}$ and a photoelastic constant of $-2\times10^{-12}$ to $2\times10^{-12}$ Pa$^{-1}$.

4. The optical thermoplastic resin according to claim 1, wherein the optical thermoplastic resin is obtained by polymerizing a monomer mixture containing 99.9 to 50 wt % of methacrylic ester, 0.1 to 50 wt % of an acrylic ester, and 0 to 40 wt % of another monofunctional monomer copolymerizable therewith.

5. The optical thermoplastic resin according to claim 1, wherein the optical thermoplastic resin has a transmitted YI of 5 or less when formed into a 2 mm-thick formed body.

6. An optical resin composition comprising the optical thermoplastic resin according to claim 1.

7. The optical resin composition according to claim 6, further comprising birefringent inorganic microparticles.

8. The optical resin composition according to claim 6, further comprising a birefringent compound having a molecular weight of 5,000 or less.

9. The optical resin composition according to claim 6, wherein the optical thermoplastic resin has a transmitted YI of 5 or less when formed into a 2 mm-thick formed body.

10. A film made of the optical thermoplastic resin according to claim 1.

11. The film according to claim 10, wherein the film is obtained by melt extrusion.

12. An injection-formed body made of the optical thermoplastic resin according to claim 1.

13. The optical thermoplastic resin according to claim 3, which is obtained by polymerizing a monomer mixture containing 99.9 to 50 wt % of methacrylic ester, 0.1 to 50 wt % of an acrylic ester, and 0 to 40 wt % of another monofunctional monomer copolymerizable therewith.

14. The optical thermoplastic resin according to claim 3, wherein the optical thermoplastic resin has a transmitted YI of 5 or less when formed into a 2 mm-thick formed body.

15. An optical resin composition comprising the optical thermoplastic resin according to claim 3.

16. The optical resin composition according to claim 15, further comprising birefringent inorganic microparticles.

17. The optical resin composition according to claim 15, further comprising a birefringent compound having a molecular weight of 5,000 or less.

\* \* \* \* \*